United States Patent
Aitbraham et al.

(10) Patent No.: US 12,540,840 B2
(45) Date of Patent: Feb. 3, 2026

(54) ELECTROMAGNETIC FLOWMETER WITH A PLURALITY OF COILS

(71) Applicant: Siemens Aktiengesellschaft, Munich (DE)

(72) Inventors: Pascal Aitbraham, Haguenau (FR); Qin Qin Fu, Dalian (CN); Frederic May, Eberbach-Seltz (FR)

(73) Assignee: Siemens Aktiengesellschaft, Munich (DE)

( * ) Notice: Subject to any disclaimer, the term of this patent is extended or adjusted under 35 U.S.C. 154(b) by 292 days.

(21) Appl. No.: 18/284,562

(22) PCT Filed: Mar. 25, 2022

(86) PCT No.: PCT/EP2022/057911
§ 371 (c)(1),
(2) Date: Sep. 28, 2023

(87) PCT Pub. No.: WO2022/207487
PCT Pub. Date: Oct. 6, 2022

(65) Prior Publication Data
US 2024/0175732 A1 May 30, 2024

(30) Foreign Application Priority Data
Mar. 31, 2021 (EP) .................................... 21166163

(51) Int. Cl.
*G01F 1/58* (2006.01)
*G01F 1/60* (2006.01)

(52) U.S. Cl.
CPC ................ *G01F 1/588* (2013.01); *G01F 1/60* (2013.01); *G01F 1/586* (2013.01)

(58) Field of Classification Search
CPC ............. G01F 1/588; G01F 1/60; G01F 1/586
See application file for complete search history.

(56) References Cited

U.S. PATENT DOCUMENTS

| 3,490,282 A | 1/1970 | Wada | |
|---|---|---|---|
| 2015/0219481 A1* | 8/2015 | Kersey | ..................... G01F 1/584 73/861.08 |
| 2021/0072056 A1* | 3/2021 | Ameri | ..................... G01F 1/586 |

FOREIGN PATENT DOCUMENTS

| DE | 1911556 | 9/1970 |
|---|---|---|
| EP | 0233084 | 8/1987 |

(Continued)

OTHER PUBLICATIONS

PCT International Search Report dated Jun. 30, 2022 based on PCT/EP2022/057911 filed Mar. 25, 2022.

*Primary Examiner* — Peter J Macchiarolo
*Assistant Examiner* — John M Royston
(74) *Attorney, Agent, or Firm* — Cozen O'Connor (57) ABSTRACT

An electromagnetic flowmeter includes a measuring section configure to permit flow of fluid through the electromagnetic flowmeter, a plurality of pairs of coils installed on the circumference of the measuring section, and a transmitter which provides at least one driving current to excite the plurality pairs of coils, wherein the plurality of pairs of coils includes a first pair of coils capable of generating a first magnetic field within the measuring section, and a second pair of coils capable of generating a second magnetic field within the measuring section, where the first and second pairs of coils from the plurality of pairs of coils are installed along a first plane of the measuring section, and where the first plane is perpendicular to the flow of the fluid in the measuring section.

10 Claims, 5 Drawing Sheets

(56) References Cited

FOREIGN PATENT DOCUMENTS

| | | |
|---|---:|---:|
| EP | 3184969 | 6/2017 |
| WO | 9315379 | 8/1993 |
| WO | 9852001 | 11/1998 |
| WO | 2014028450 | 2/2014 |

* cited by examiner

ELECTROMAGNETIC FLOWMETER WITH A PLURALITY OF COILS

CROSS-REFERENCE TO RELATED APPLICATIONS

This is a U.S. national stage of application No. PCT/EP2022/057911 filed 25 Mar. 2022. Priority is claimed on European Application No. 21166163.2 filed 31 Mar. 2021, the content of which is incorporated herein by reference in its entirety.

BACKGROUND OF THE INVENTION

1. Field of the Invention

The current disclosure relates to flowmeters and, more particularly, to electromagnetic flowmeters utilized to measure flow of fluids in large pipes in industrial automation. Electromagnetic flowmeters (also referred to as magnetic-inductive flowmeters) measure the velocity and volume of fluid on the basis of electrodynamic induction, where a magnetic field is generated by the electromagnetic flowmeter, perpendicular to the flow direction and, accordingly, due to the interaction between the magnetic field and the conductive fluid flowing, a voltage perpendicular to the magnetic field and to the flow direction is generated and which is then measured via electrodes (known as measuring electrodes) such that the velocity and volume of the fluid flowing is accordingly determined based on the magnitude of the voltage generated.

2. Description of the Related Art

The current disclosure relates to electromagnetic flowmeters. As mentioned previously, electromagnetic flowmeters measure volumetric flow of fluid by applying a magnetic field perpendicular to the flow of the fluid. Accordingly, to generate the magnetic field, the electromagnetic flowmeter includes a plurality of electromagnetic coils which, when excited (by applying a current to them), generate the magnetic field. Electromagnetic flowmeters can be used along with pipes of various sizes including large diameter pipes. For large diameter electromagnetic flowmeters, coils have to be of special construction, to ensure the generated magnetic field is spread across the diameter of a measuring section of the electromagnetic flowmeter.

Often such flowmeters utilize a pair of diamond shaped or rhombus shaped of coils, where each coil covers half of the circumference of a measuring section. Through the rhombus shape, the resultant magnetic field is distributed across the cross section of the flowmeter. However, this requires large coils which are difficult to construct and often involve substantial costs. Additionally, special care has to be taken during the construction of the flowmeter to ensure that the large coils are installed properly on the measuring section of the electromagnetic flowmeter. Accordingly, there is a need for an electromagnetic flowmeter which addresses the issues mentioned above.

SUMMARY OF THE INVENTION

In view of the foregoing, it is accordingly an object of the present invention to provide an electromagnetic flowmeter that can be installed on a fluid carrying channel for measuring a volumetric flow of a fluid flowing within the fluid carrying channel.

These and other objects and advantages are achieved by an electromagnetic flowmeter that comprises a measuring section configured to permit flow of through the fluid the electromagnetic flowmeter, a plurality of pairs of coils installed on the circumference of the measuring section, and a transmitter for exciting the plurality pairs of coils by providing at least one driving current. The plurality of pairs of coils comprises a first pair of coils capable of generating a first magnetic field within the measuring section, and a second pair of coils capable of generating a second magnetic field within the measuring section. The first and second pairs of coils from the plurality of pairs of coils are installed along a first plane of the measuring section, where the first plane is perpendicular to the flow of the fluid in the measuring section. Accordingly, this ensures that most of the generated magnetic fields are all along the same plane and ensure proper measurement of the volumetric flow.

Accordingly, by using a plurality of pairs of coils, the electromagnetic flowmeter can ensure that resultant magnetic fields are spread evenly across the cross section of the measuring section of the electromagnetic flowmeter. Additionally, each pair of coils can be excited by the transmitter by a corresponding driving current. As a result, the interaction between the resultant magnetic fields can be controlled to ensure even distribution in the cross section of the measuring section of the electromagnetic flowmeter. Additionally, each coil from the pair of coils is required to generate a magnetic field covering only a part of the cross section of the measuring section. Consequently, the size of the coil is relatively small and therefore the construction effort and the cost of the electromagnetic flowmeter is relatively low. The first magnetic field is distinct from the second magnetic field.

In an exemplary embodiment, a value of at least one parameter associated with a driving current of the first magnetic field is distinct from a corresponding value of the corresponding at least one parameter associated with a driving current of the second magnetic field. For example, the driving current of the first magnetic field may have a different amplitude or frequency compared to the driving current of the second magnetic field. Accordingly, the first magnetic field is different from the second magnetic field.

Additionally, a first coil from the first pair of coils forms one pole of the first magnetic field and a second coil from the first pair of coils forms the second pole of the first magnetic field. Similarly, a first coil from the second pair of coils forms one pole of the second magnetic field and a second coil from the second pair of coils forms the second pole of the second magnetic field. Accordingly, a magnetic circuit associated with the first magnetic field is distinct from a magnetic circuit associated with the second magnetic field. Accordingly, while each magnetic field is distinct from the other magnetic fields, by having a plurality of magnetic fields spread across the majority of the measuring section using smaller coils, the need for large and expensive coils is eliminated.

In another exemplary embodiment, the plurality of coils includes a third pair of coils capable of generating a third magnetic field. The third magnetic field is capable of interacting with at least one of the first and the second magnetic field for tuning at least one of the first magnetic field and the second magnetic field. Accordingly, the third pair of coils allow for adjusting the magnetic fields to ensure operation of the electromagnetic flowmeter.

In a further exemplary embodiment, the first pair of coils and the second pair of coils are connected in a series connection to each other.

In another exemplary embodiment, the first pair of coils are connected to the transmitter via a first electrical connection, and the second pair of coils are connected to the transmitter via a second electrical connection.

In yet another exemplary embodiment, the first pair of coils and the second pair of coils are connected in a parallel connection to each other.

The objects and advantages in accordance with the invention are also achieved by a method for measuring a volumetric flow fluid carrying channel for measuring a volumetric flow of a fluid flowing within the fluid carrying channel using an electromagnetic flowmeter. The electromagnetic flowmeter comprises a measuring section configured to permit the flow of the fluid through the electromagnetic flowmeter, a plurality of pairs of coils installed on the circumference of the measuring section, and a transmitter for exciting the plurality of coils by providing a plurality of driving currents. The method comprises providing a first driving current to a first pair of coils for generating a first magnetic field and providing a second driving current to a second pair of coils for generating a second magnetic field. The magnetic circuit associated with the first magnetic field is distinct is from the magnetic circuit associated with the second magnetic field. The method further comprises measuring a voltage generated on a pair of measuring electrodes and determining the volumetric flow rate based on the measured voltage.

In an exemplary embodiment, the method further comprises determining a parameter associated with the first magnetic field and providing a third driving current to a third pair of coils based on the determined parameter associated with the first magnetic field, where the third pair of coils generate a third magnetic field for tuning the first magnetic field. The advantages of the device apply to the method described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The aspects of the disclosed invention are further described in relation to the following detailed description with reference to the drawings, in which.

DETAILED DESCRIPTION OF THE EXEMPLARY EMBODIMENTS

Figure 1:
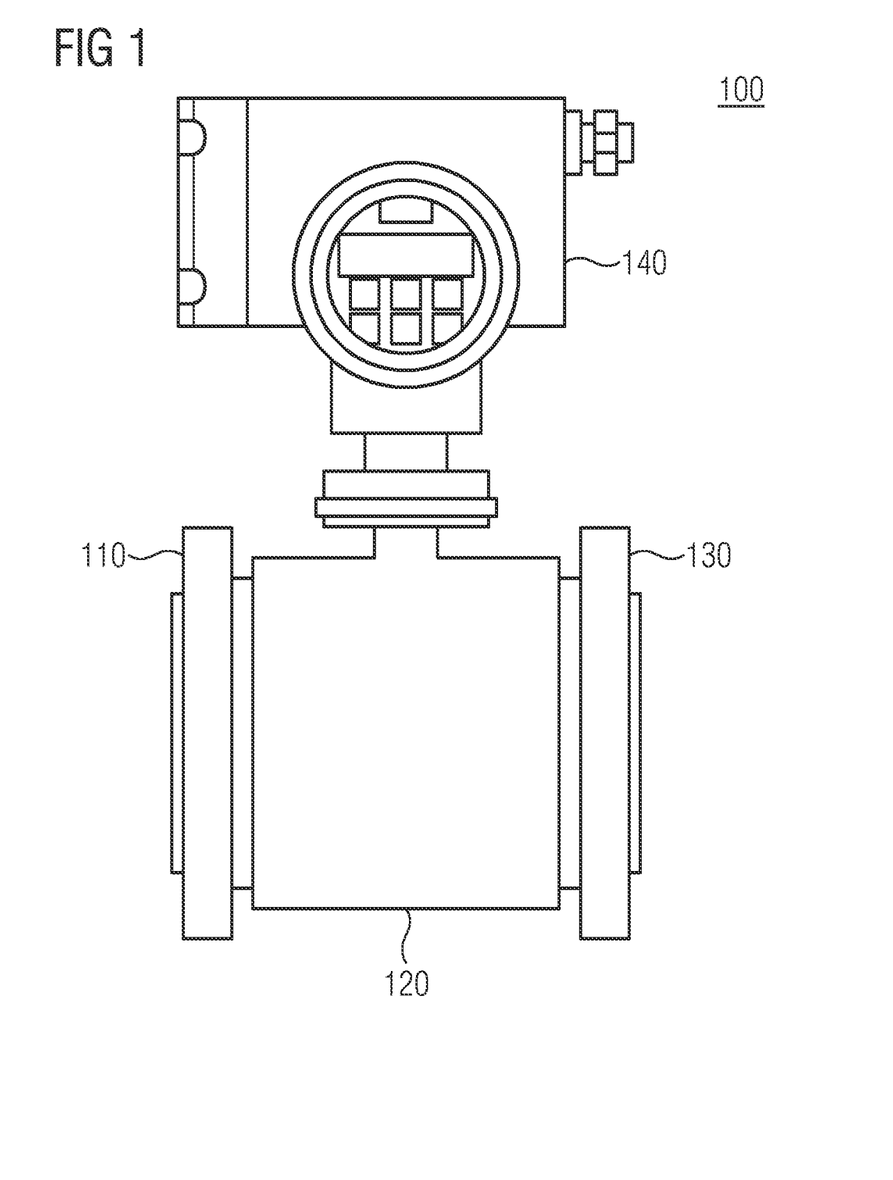
FIG. 1 is an exemplary electromagnetic flowmeter with a transmitter in accordance with the invention.

FIG. 1 illustrates an exemplary electromagnetic flowmeter 100 in accordance with the instant disclosure. The electromagnetic flowmeter 100 is installed on a pipe (also referred to as fluid carrying channel) in an industrial facility for measuring volumetric flow of a conducting fluid through the pipe. The electromagnetic flowmeter comprises flanges 110 and 130 for connecting to the flowmeter 100 to the ends of two pipes in the industrial facility. Additionally, the electromagnetic flowmeter 100 includes a measuring section 120 that forms the main channel of the electromagnetic flowmeter 100 through which the conducting fluid flows through. Additionally, the electromagnetic flowmeter 100 transmitter and human machine includes a interface (HMI) module 140. The transmitter and HMI module 140 allows for display of values associated with the electromagnetic flowmeter 100 and configuration of the electromagnetic flowmeter 100. Additionally, the transmitter and HMI module 140 is capable of exciting a plurality of coils (also known as electromagnetic coils) for measurement of the volumetric flow of the fluid through the flowmeter.

Figure 2:
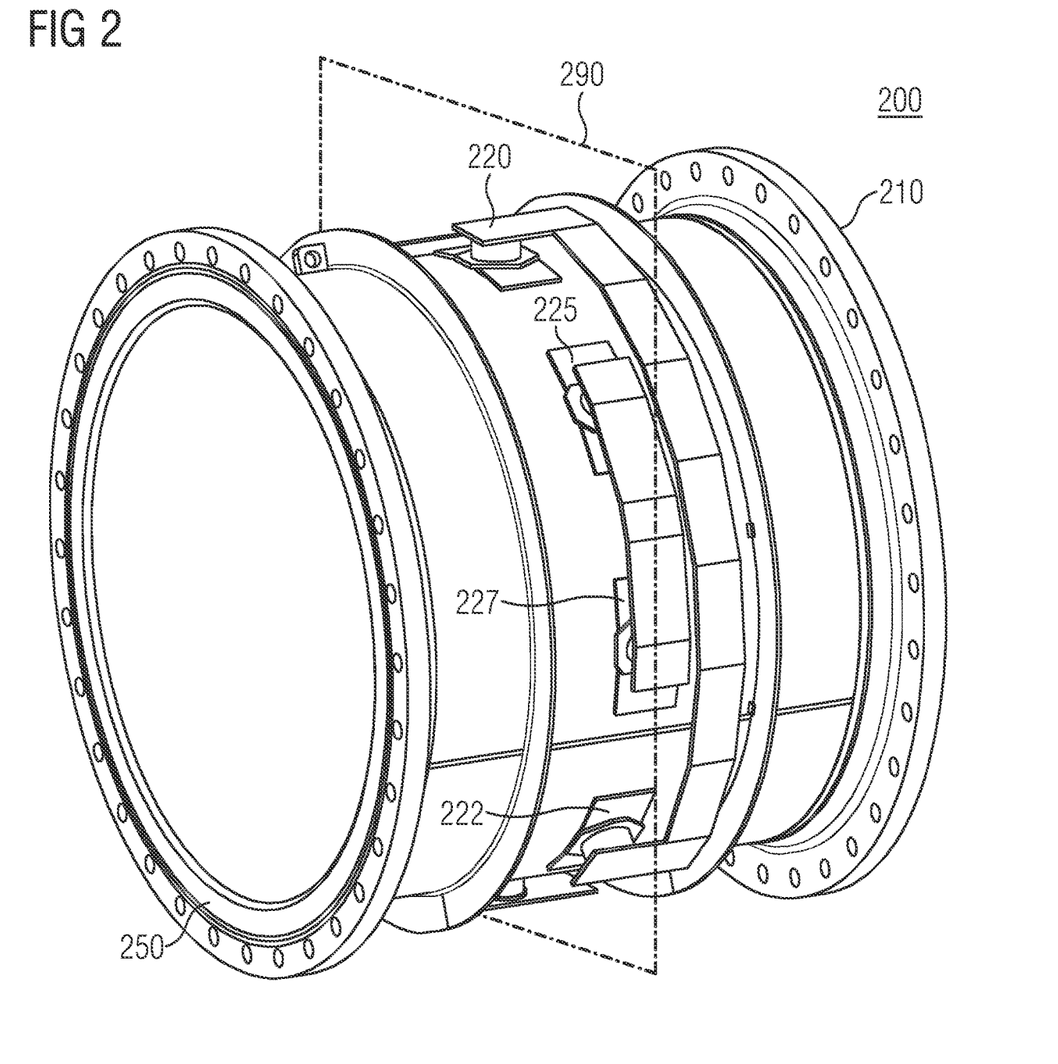
FIG. 2 is a perspective view of a measuring section with a plurality of pairs of coils of the exemplary electromagnetic flowmeter of FIG. 1.

The measuring section and the coils are further illustrated in FIG. 2 and explained in the description associated with FIG. 2, which shows a perspective internal view of an exemplary measuring section 210. The measuring section 210 that forms the main channel of the electromagnetic flowmeter 100 through which the conducting fluid flows through. The measuring section 210 includes an insulating liner 250 within the inner diameter of the measuring section to insulate the fluid from the remainder of the measuring section 210. On the outer diameter of the measuring section 210, a plurality of pairs of electromagnetic coils (shown as coils 220, 222, 225, 227) are installed for generating a plurality of magnetic fields within the inner diameter of the measuring section 210. The plurality of pairs of coils (220, 222, 225, 227) are installed along a first plane 290 of the measuring section 210. The first plane 290 is perpendicular to the flow of the fluid in the measuring section 210. The interaction of the magnetic fields and the conducting fluid flowing through the measuring section 210 generates a voltage that is then measured by one or more measuring electrodes. The generated voltage is proportional to the magnetic field and the velocity of the fluid and accordingly, based on the generated voltage, the velocity of the fluid can be determined.

Relative to diamond coils, as known in the state of the art, the relative size of each coil from each pair of coils is small and accordingly each coil does not produce a magnetic field that covers the entire cross section of the measuring section 210. However, this issue is addressed by having a plurality of pairs of coils that generate a plurality of magnetic fields. Accordingly, the plurality of magnetic fields cover the majority of the cross section of the measuring section 210. Therefore, through the usage of the small coils (where each magnetic field generated by a corresponding pair of coils covers only a part of measuring section), the ease of construction of the electromagnetic flowmeter 100 is improved and the overall cost of the electromagnetic flowmeter 100 is relatively low.

Figure 3:
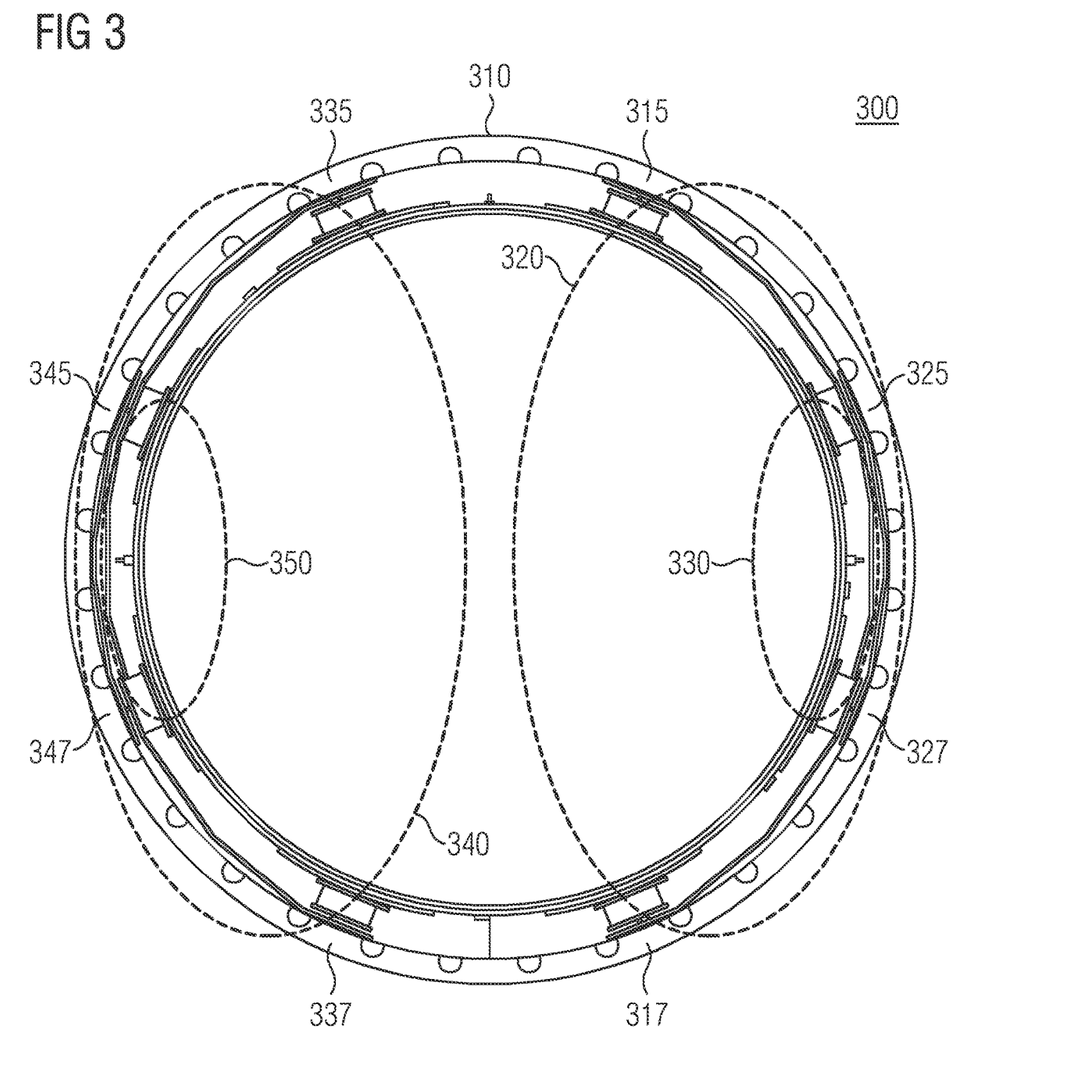
FIG. 3 is front cross-sectional view of the exemplary electromagnetic flowmeter of FIG. 1 illustrating the plurality of pairs of coils mounted on the measuring section and the plurality of magnetic fields generated by the plurality of pairs of coils.

The electromagnetic coils and the magnetic fields are further explained in relation to in FIG. 3, which shows front cross-sectional view of the exemplary measuring section 310 illustrating the plurality of pairs of coils (shown as coils 325 and 327, 315 and 317, 335 and 337, 345 and 347). As mentioned previously, the plurality of pairs of coils (325 & 327, 315 & 317, 335 & 337, 345 & 347) are mounted on the measuring section 310. While in the figure, four pairs of coils (325 & 327, 315 & 317, 335 & 337, 345 & 347) are shown, it should be understood there may be other combinations involving at least two pairs of coils (such as six pairs of coils, or eight pairs of coils). Each pair of coils generates a corresponding magnetic field upon being excited by a driving current from a transmitter. For example, as shown in the figure, the pair of coils 325 and 327, when excited, generate the magnetic field 330. Similarly, the pair of coils 315 and 317, when excited, generate the magnetic field 320. Similarly, the pairs of coils 335 and 337, when excited, generate the magnetic field 340. Similarly, the pairs of coils 345 and 347, when excited, generate the magnetic field 350. While all the pairs of coils can be excited to generate the corresponding magnetic fields, in an example, a selected number of pairs of coils are excited for generating the corresponding magnetic fields during normal operating condition. For example, during normal operation, only the pairs 315 and 317 (also referred to as a first pair of coils), and 335 and 337 (also referred to as a second pair of coils) are excited by the transmitter for generating the magnetic fields 320 (also referred to as a first magnetic field) and 340 (also referred to as second magnetic field). A first coil from the first pair of coils forms one pole of the first magnetic field and a second coil from the first pair of coils forms the second pole of the first magnetic field. Similarly, a first coil from the second pair of coils forms one pole of the second magnetic field and a second coil from the second pair of coils forms the second pole of the second magnetic field. The first and the second magnetic fields 320 and 340 interact with the conducting fluid flowing through the measuring section 310 and generate a voltage across two or more measuring electrodes (not shown in the figure) mounted on the measuring section 310. The first and second pairs of coils (315 and 317, 335 and 337) are connected to and excited by the transmitter.

Figure 4A:
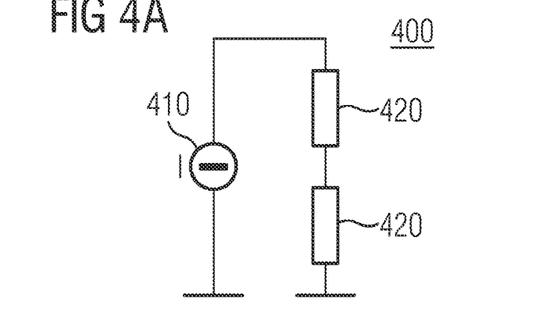
FIG. 4 illustrates two pairs of coils connected in series to the transmitter in section A, connected in parallel in section B and connected two different power sources in section C in accordance with the invention.

FIGS. 4a to 4d illustrate a plurality of embodiments in which the first and second pair of coils are connected. In an exemplary embodiment, as shown in FIG. 4A, the first and second pairs of coils (420, 430) are connected in series to each other and to a current source 410 associated with the transmitter. Accordingly, the same driving current is provided to the first and second pairs of coils.

Figure 4B:
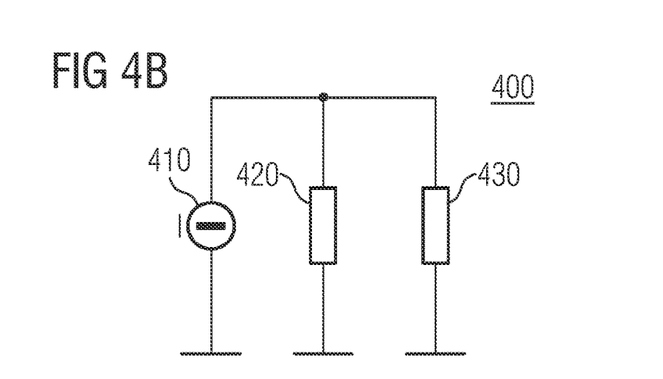

In another exemplary embodiment, the first and second pairs of coils (420, 430) are connected in parallel to each other, as shown in FIG. 4B, while being connected to the same current source 410 associated with the transmitter. Accordingly, the driving current is divided between the first pair of coils 420 and the second pair of coils 430. Consequently, while the magnetic circuits and magnetic poles of the first magnetic field and the second magnetic field are different, the magnitude and characteristics of the first and second magnetic fields may be similar (when connected in series or in parallel).

Figure 4C:
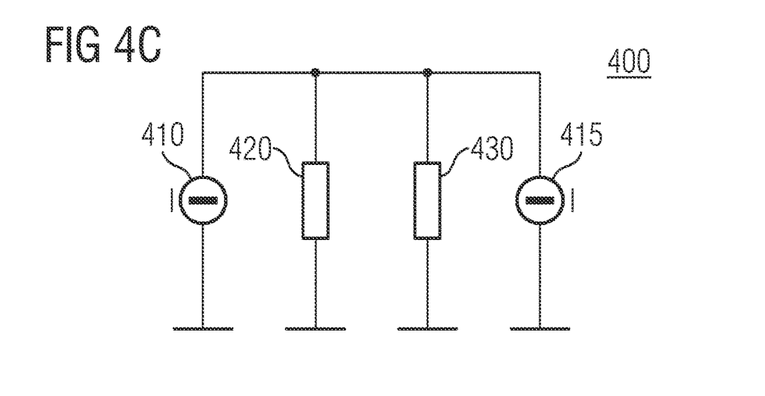

In yet another exemplary embodiment, the first and the second pair of coils (420, 430) may be connected to two different current sources (410, 415) associated with the transmitter, as shown in FIG. 4C. For example, the first pair of coils 420 are connected to the current source 410 and the second pair of the coils 430 are connected to the current source 415. Accordingly, the driving current used to excite the first pair of coils 410 may be different from the driving current used to excite the second pairs of coils 430. For example, the frequency or magnitude of the driving current for exciting the first pair of coils 410 may be different from the frequency or magnitude of the driving current for exciting the second pairs of coils 430. Accordingly, the first magnetic field may be different from the second magnetic field.

As mentioned above, during normal operation, only the first and second pair of coils are active and, accordingly, only the first and second magnetic fields are generated within the measuring section. However, when abnormal operation is detected or based on a predefined criterion, one or more additional pairs of coils are excited (in addition to the first and second pairs of coils). For example, when the volume of fluid flowing in the measuring section is too small, additional magnetic fields may be required to ensure accurate measurement. Accordingly, the coils 345 and 347 and coils 325 and 327, may be excited to generate a third and fourth magnetic fields (350 and 330). As mentioned previously, the driving current provided to the coils 345 and 347, and coils 325 and 327 may be similar or different from the currents provided to the first and second pair of coils (315 & 317, 335 & 337).

In another embodiment, the additional pairs of coils are excited to interact with the first and the second magnetic fields. For example, the coils 325 and 327 generate the magnetic field 330 which is capable of interacting with the magnetic field 320 (generated by the coils 315 and 317). For example, the magnetic field 330 can tune the magnetic field 320 or amplify the magnetic field 320. Similarly, the coils 345 and 347 generate the magnetic field 350 which is capable of interacting with the magnetic field 340 (generated by the coils 335 and 337). For example, the magnetic field 350 can tune the magnetic field 340 or amplify the magnetic field 340.

Figure 5:
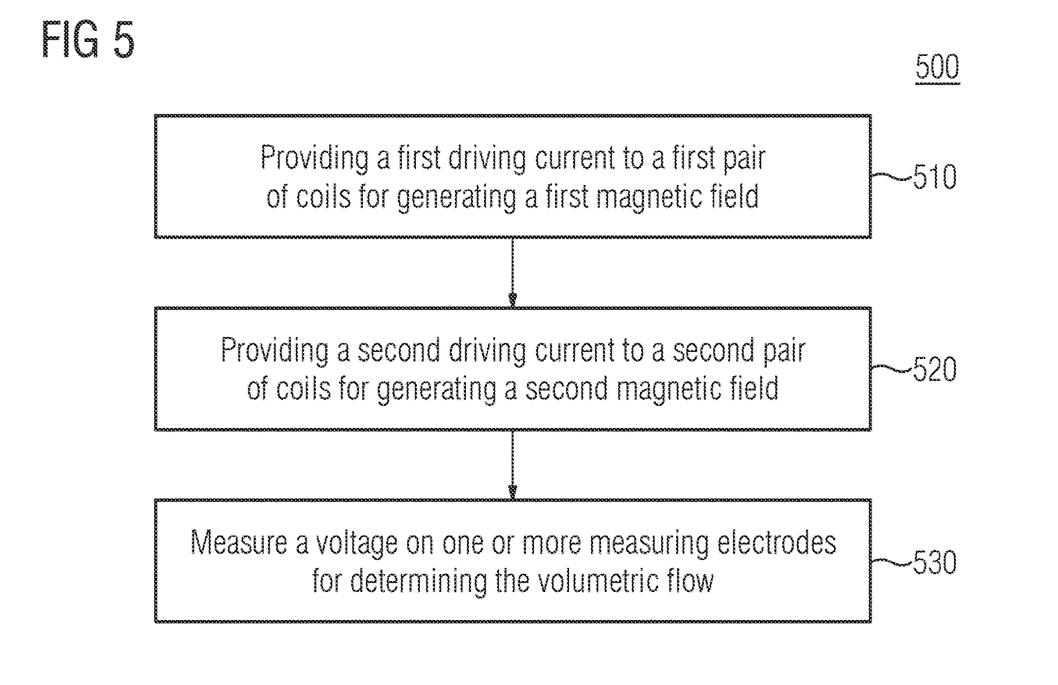
FIG. 5 is a flowchart of a method for measuring a volumetric flow fluid carrying channel for measuring a volumetric flow of a fluid flowing within the fluid carrying channel using an electromagnetic flowmeter in accordance with the invention.

FIG. 5 is a flowchart of a method 500 for measuring a volumetric flow fluid carrying channel for measuring a volumetric flow of a fluid flowing within the fluid carrying channel using an electromagnetic flowmeter as described in accordance with the disclosed embodiments.

With reference to the exemplary method 500 shown in FIG. 5, the method 500 is performed by the electromagnetic flowmeter where, at step 510, the transmitter of the electromagnetic flowmeter provides a first driving current to a first pair of coils for generating a first magnetic field. Next, at step 520, the transmitter of the electromagnetic flowmeter provides a second driving current to a second pair of coils for generating a second magnetic field. At step 530, the transmitter then measures a voltage generated across one or more measuring electrodes due to the interaction of the generated magnetic fields and the conducting fluid. Based on the voltage, the electromagnetic flowmeter then determines the volumetric flow of the fluid. Additionally, as mentioned, a magnetic circuit associated with the first magnetic field is distinct is from a magnetic circuit associated with the second magnetic field.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electromagnetic flowmeter installable on a fluid carrying channel for measuring a volumetric flow of a fluid flowing within the fluid carrying channel, the electromagnetic flowmeter comprising:
   a) a measuring section configured to permit flow of the fluid through the electromagnetic flowmeter;
   b) a plurality of pairs of coils installed on a circumference of the measuring section, the plurality of pairs of coils comprising:
      i) a first pair of coils configured to generate a first magnetic field within the measuring section; and
      ii) a second pair of coils configured to generate a second magnetic field within the measuring section; and
   c) a transmitter which provides at least one driving current to excite the plurality of pairs of coils;
   wherein the first and second pairs of coils from the plurality of pairs of coils are installed along a first plane of the measuring section, the first plane being perpendicular to the flow of the fluid in the measuring section;
   wherein the plurality of pairs of coils includes a third pair of coils configured to generate a third magnetic field; and
   wherein the third pair of coils is excited upon detection of an abnormal operation; and
   wherein the generated third magnetic field tunes at least one of the first magnetic field and the second magnetic field.

2. The electromagnetic flowmeter as claimed in claim 1, wherein the transmitter provides a first driving current to the first pair of coils for generating the first magnetic field and a second driving current to the second pair of coils for generating the second magnetic field.

3. The electromagnetic flowmeter as claimed in claim 1, wherein a diameter of the measuring section is within a range of 1200 millimeters to 3200 millimeters.

4. The electromagnetic flowmeter as claimed in claim 1, wherein the magnetic field strength at a center of the measuring section is between 0.01 milli Tesla and 10 milli Tesla based on the first and the second magnetic fields.

5. The electromagnetic flowmeter as claimed in claim 1, wherein the first magnetic field is distinct from the second magnetic field; and wherein a value of at least one parameter associated with a first driving current is distinct from a corresponding value of a corresponding at least one parameter associated with a second driving current.

6. The electromagnetic flowmeter as claimed in claim 1, wherein a first coil from the first pair of coils forms a pole of the first magnetic field and a second coil from the first pair of coils forms another pole of the first magnetic field.

7. The electromagnetic flowmeter as claimed in claim 1, wherein a magnetic circuit associated with the first magnetic field is distinct is from a magnetic circuit associated with the second magnetic field.

8. The electromagnetic flowmeter as claimed in claim 1, wherein the first pair of coils and the second pair of coils are interconnected in series.

9. The electromagnetic flowmeter as claimed in claim 1, wherein the first pair of coils and the second pair of coils are connected in parallel with each other.

10. The electromagnetic flowmeter as claimed in claim 1, wherein the first pair of coils are connected to the transmitter via a first electrical connection; and wherein the second pair of coils are connected to the transmitter via a second electrical connection.

* * * * *